United States Patent
Lyon et al.

(10) Patent No.: US 8,740,152 B1
(45) Date of Patent: Jun. 3, 2014

(54) RIVETLESS NUTPLATES FOR AIRCRAFT

(75) Inventors: Daniel J. Lyon, Wichita, KS (US); Ming Kwan Tse, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 1080 days.

(21) Appl. No.: 12/420,742

(22) Filed: Apr. 8, 2009

Related U.S. Application Data

(60) Provisional application No. 61/049,660, filed on May 1, 2008.

(51) Int. Cl.
*B64D 45/00* (2006.01)

(52) U.S. Cl.
USPC ..... 244/132; 244/129.3; 244/131; 29/525.13; 156/578; 52/745.15; 52/745.16

(58) Field of Classification Search
USPC ........... 52/208; 29/897.2, 525.01, 525.02, 29/525.13; 244/129.3, 131, 132, 133; 156/578
See application file for complete search history.

(56) References Cited

U.S. PATENT DOCUMENTS

| | | | | |
|---|---|---|---|---|
| 4,338,151 A | * | 7/1982 | Hutter, III | 156/719 |
| 4,364,533 A | * | 12/1982 | Pompei et al. | 244/129.3 |
| 4,817,347 A | * | 4/1989 | Hand et al. | 52/171.3 |
| 5,013,391 A | * | 5/1991 | Hutter et al. | 156/578 |
| 5,704,747 A | * | 1/1998 | Hutter et al. | 411/70 |
| 6,619,590 B2 | * | 9/2003 | Wojatschek et al. | 244/129.3 |
| 7,237,314 B2 | * | 7/2007 | Toosky | 29/525.02 |
| 8,079,185 B2 | * | 12/2011 | Paspirgilis | 52/204.62 |
| 8,402,838 B1 | * | 3/2013 | Ware | 73/798 |
| 2003/0010867 A1 | * | 1/2003 | Wojatschek et al. | 244/129.2 |
| 2005/0025606 A1 | * | 2/2005 | Toosky | 411/181 |
| 2005/0039936 A1 | * | 2/2005 | Hikita et al. | 174/35 R |
| 2005/0117994 A1 | * | 6/2005 | Toosky | 411/181 |
| 2006/0008625 A1 | * | 1/2006 | Recker et al. | 428/195.1 |
| 2006/0107600 A1 | * | 5/2006 | Nestell et al. | 49/413 |
| 2006/0123718 A1 | * | 6/2006 | Paspirgilis | 52/204.1 |
| 2006/0157890 A1 | * | 7/2006 | Amano et al. | 264/252 |
| 2007/0053761 A1 | * | 3/2007 | Cohen et al. | 411/113 |
| 2007/0180674 A1 | * | 8/2007 | Morden et al. | 29/407.01 |
| 2008/0141603 A1 | * | 6/2008 | Harvey et al. | 52/315 |
| 2010/0018959 A1 | * | 1/2010 | Wilson | 219/202 |

OTHER PUBLICATIONS

AvStop.com, Rivets, Mar. 16, 2006.*
Click Bond CB6008 Nutplate materials.

(Continued)

*Primary Examiner* — William Gilbert
*Assistant Examiner* — Alp Akbasli
(74) *Attorney, Agent, or Firm* — Lathrop & Gage LLP

(57) ABSTRACT

Methods for attaching a window to an airframe, methods of maintaining structural integrity of an airframe while attaching a window to the airframe, and portions of an aircraft are set forth herein. One method for attaching a window to an airframe comprises the steps of: applying to a bonding surface of a nutplate an adhesive; inserting through an airframe hole a fixture attached to a nut of the nutplate, and applying tension to the fixture to hold the adhesive-coated bonding surface of the nutplate adjacent an interior surface of the airframe; allowing the adhesive to cure; removing the fixture from the nut of the nutplate; and installing a bolt through a hole of a retainer, through the hole in the airframe, and into the nutplate; the retainer being in contact with and securing the window to the airframe. The adhesive is selected such that very specific conditions are met.

10 Claims, 2 Drawing Sheets

(56) References Cited

OTHER PUBLICATIONS

Click Bond CB200-40—Material Safety Data Sheet.
Henkel 9446—Material Safety Data Sheet.
3M DP810NS—Material Safety Data Sheet.
ITW Plexus AO420—Material Safety Data Sheet.
Devcon Metal Welder—Material Safety Data Sheetterials.
Devcon Metal Welder II—Material Safety Data Sheet.
Henkel Loctite 454—Material Safety Data Sheet.
3M EC3501—Material Safety Data Sheet.
3M Scotch Weld 2216—Material Safety Data Sheet.
3M EC2615—Material Safety Data Sheet.
ITW Devcon HP250—Material Safety Data Sheet.
ITW Devcon HP250FR—Material Safety Data Sheet.
Devcon 10 Min. FR—Material Safety Data Sheet.
3M Automix 8115—Material Safety Data Sheet.
Henke EA9371—Material Safety Data Sheet.
Devcon FastCure—Material Safety Data Sheet.
Henkel EA9359.3—Material Safety Data Sheet.
3M Automix 08107—Material Safety Data Sheet.
Devcon Epoxy Plus 25—Material Safety Data Sheet.
Henkel EA9394.2—Material Safety Data Sheet.
AC Tech AC236 B—Material Safety Data Sheet.
AC Tech AC350 B—Material Safety Data Sheet.
PRC DeSoto P/S 890 Class B—Material Safety Data Sheet.
Magnolia 123-464—Material Safety Data Sheet.

\* cited by examiner

RIVETLESS NUTPLATES FOR AIRCRAFT

RELATED APPLICATIONS

This application claims priority to provisional U.S. Patent Application Ser. No. 61/049,660 filed May 1, 2008, the disclosure of which is incorporated herein by reference.

FIELD

The present document relates to the field of fastening devices and methods for assembly of aircraft.

BACKGROUND

Many fixed and rotary-wing aircraft have parts, including but not limited to access covers, cowling panels, spinner cones, and fairings, that must be removably attached to other parts of the airframe. Typically, it is desirable to use screws for this removable attachment of such removable parts.

Many of these removable parts are attached in places where access is possible from only one side—there is a "blind" side inaccessible to wrenches, hands, and tools once the removable part is in place; the blind side often being accessible with the removable part removed or at some point during airframe assembly. Further, many of these removable parts are attached to portions of airframe made of sheet metal or plastic that is too thin to provide adequate engagement for screws.

Nutplates are frequently used to provide a female-threaded nut of adequate thickness to provide good engagement for a screw, to hold that nut in place on the blind side of airframe structure, and to prevent rotation of that nut during screw insertion and removal.

Nutplates are generally attached to airframe parts by riveting, but this is an expensive and time consuming process since countersinking of the rivets is often required to provide a smooth base for the removable part. Further, riveting of nutplates requires that additional holes be drilled into the airframe for those rivets, and each such hole slightly weakens the airframe. Nutplates have also been formed as spring-clips that require additional, large, or non-circular holes in the airframe.

U.S. Pat. No. 5,013,391 describes a nutplate having a base adapted for gluing to the blind side of a substrate. Screws for attaching the removable parts are threaded into this nutplate when the removable part is attached. Adhering a nutplate to a substrate is therefore known. In addition, some prior art systems have used Click Bond CB200-40 to adhere a nutplate to an airframe. Nevertheless, adhering a nutplate to an airframe has previously been unacceptable, or at least not preferable, due to the stresses and assembly requirements involved. For example, prior art systems using Click Bond CB200-40 have been measured to have a low lap shear strength at reduced temperatures (e.g., service temperatures of around −67 F), failure for those systems has been detected at approximately 50 pounds of push out force at −67 F, and those systems have been determined to have a relatively low safety factor (i.e., around 1.3) for hot and humid conditions (i.e., around 160 F with 95% relative humidity). As a result, prior art aircraft generally use rivets or spring-clips to attach nutplates.

SUMMARY

In one embodiment, a method for attaching a window to an airframe comprises the steps of: (a) applying to a bonding surface of a nutplate an adhesive; (b) inserting through a hole in the airframe an elastomeric fixture attached to a nut of the nutplate, and pulling the elastomeric fixture to apply tension to the elastomeric fixture to hold the adhesive-coated bonding surface of the nutplate adjacent an interior surface of the airframe; (c) allowing the adhesive to cure; (d) removing the elastomeric fixture from the nut of the nutplate; and (e) installing a bolt through a hole of a retainer, through the hole in the airframe, and into the nutplate; the retainer being in contact with and securing the window to the airframe. The adhesive is selected such that the nutplate is secured by the adhesive such that: (a) the bond between the nutplate and the airframe will withstand a bolt-fastening torque of at least 60 inch pounds; (b) the bond between the nutplate and the airframe will withstand cycling over a range of temperatures corresponding to a temperature range expected to be encountered by an aircraft; (c) the bond between the nutplate and the airframe will withstand a push out force of at least one hundred pounds over the range of temperatures corresponding to the temperature range expected to be encountered by an aircraft; and (d) the bond between the nutplate and the airframe will withstand flexing of the airframe during pressurization cycles expected to be encountered by an aircraft. The adhesive has a working time of at least 15 minutes.

In another embodiment, a method for attaching a window to an airframe, comprises the steps of: (a) applying an adhesive to a surface of a nutplate; (b) maintaining the adhesive-coated bonding surface of the nutplate adjacent an interior surface of the airframe such that the adhesive interacts with the airframe; (c) allowing the adhesive to cure; and (d) installing a bolt through a hole of a retainer, through a hole in the airframe, and into the nutplate. The retainer is in contact with and secures the window to the airframe. The adhesive comprises at least one of the following compositions:

| Ingredient | approximate % by Wt |
| --- | --- |
| Methyl Methacrylate | 40-70 |
| Chlorosulfonated Polyethylene | 10-30 |
| Acrylic Polymer - N.J.T.S. Reg No. 800941-5008P | 5-10 |
| Acrylic Polymer - N.J.T.S. Reg No. 800941-5007P | 3-7 |
| Maleic Acid | 1-5 |
| Cumene Hydroperoxide | 0.5-1.5 |
| 2,6-di-tert-Butyl-p-Cresol | 0.5-1.5 | and

| Ingredient | approximate % by Wt |
| --- | --- |
| METHYLENE PHENYLENE ISOCYANATE | 35 |
| URETHANE PREPOLYMER | 19-23 |
| MDI HOMOPOLYMER | 12-16 |
| CALCIUM SODIUM ALUMINOSILICATE | 8-12 |
| TALC | 8-12 |
| URETHANE PREPOLYMER | 3-7 |
| AMORPHOUS SILICA | 2-6 |

In still another embodiment, a method of maintaining structural integrity of an airframe while attaching a window to the airframe during manufacture of an aircraft comprises the steps of not riveting a nutplate to the airframe, but instead: (a) applying to a bonding surface of the nutplate an adhesive selected from the group consisting of urethane adhesives and methyl methacrylate adhesives; (b) maintaining the adhesive-coated bonding surface of the nutplate adjacent an interior surface of the airframe; (c) allowing the adhesive to cure; and (d) installing a bolt through a hole of a retainer, through the hole in the airframe, and into the nutplate. The retainer is in contact with and secures the window to the airframe, and the adhesive has a working time of at least 15 minutes. The adhesive is selected such that the nutplate is secured by the adhesive such that: (a) the bond between the nutplate and the airframe will withstand a bolt-fastening torque of at least 60 inch pounds; (b) the bond between the nutplate and the airframe will withstand cycling over a range of temperatures corresponding to a temperature range expected to be encountered by an aircraft; (c) the bond between the nutplate and the airframe will withstand a push out force of at least one hundred pounds over the range of temperatures corresponding to the temperature range expected to be encountered by an aircraft; and (d) the bond between the nutplate and the airframe will withstand flexing of the airframe during pressurization cycles expected to be encountered by an aircraft.

In still yet another embodiment, a portion of an aircraft comprises an airframe, a nutplate, a retainer coupled to a window, and a bolt. The nutplate is coupled to the airframe by adhesive, and a bolt passes through a hole of the retainer, through a hole in the airframe, and into the nutplate to secure the retainer to the airframe. The adhesive comprises at least one of the following compositions:

| Ingredient | approximate % by Wt |
|---|---|
| Methyl Methacrylate | 40-70 |
| Chlorosulfonated Polyethylene | 10-30 |
| Acrylic Polymer - N.J.T.S. Reg No. 800941-5008P | 5-10 |
| Acrylic Polymer - N.J.T.S. Reg No. 800941-5007P | 3-7 |
| Maleic Acid | 1-5 |
| Cumene Hydroperoxide | 0.5-1.5 |
| 2,6-di-tert-Butyl-p-Cresol | 0.5-1.5 | and

| Ingredient | approximate % by Wt |
|---|---|
| METHYLENE PHENYLENE ISOCYANATE | 35 |
| URETHANE PREPOLYMER | 19-23 |
| MDI HOMOPOLYMER | 12-16 |
| CALCIUM SODIUM ALUMINOSILICATE | 8-12 |
| TALC | 8-12 |
| URETHANE PREPOLYMER | 3-7 |
| AMORPHOUS SILICA | 2-6 |

DETAILED DESCRIPTION OF THE EMBODIMENTS

Many pressurized light business jet windshields must be readily removed for maintenance, yet must be retained in place despite widely varying temperatures and the considerable force of cabin pressurization. This sort of windshield is retained in position using a retainer. The retainer is attached using countersunk bolts inserted through holes in the windshield frame portion of the airframe and screwed into nuts of nutplates attached to the interior of the frame. Since the bolts are removable standard threaded fasteners, the windshield is readily removed and reinstalled by unscrewing or reinstalling them.

Figure 1:
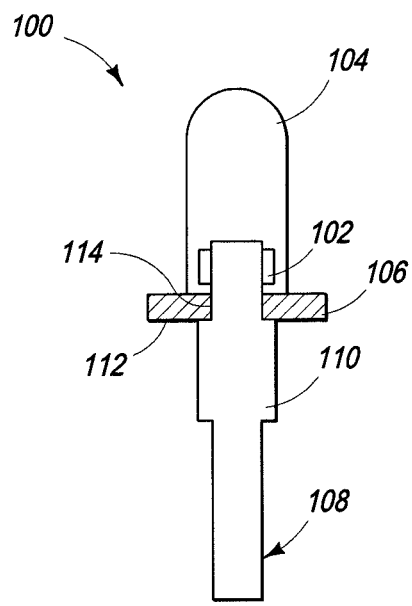
FIG. 1 is a sectional view of a nutplate adapted to attachment by use of an adhesive.
Figure 2:
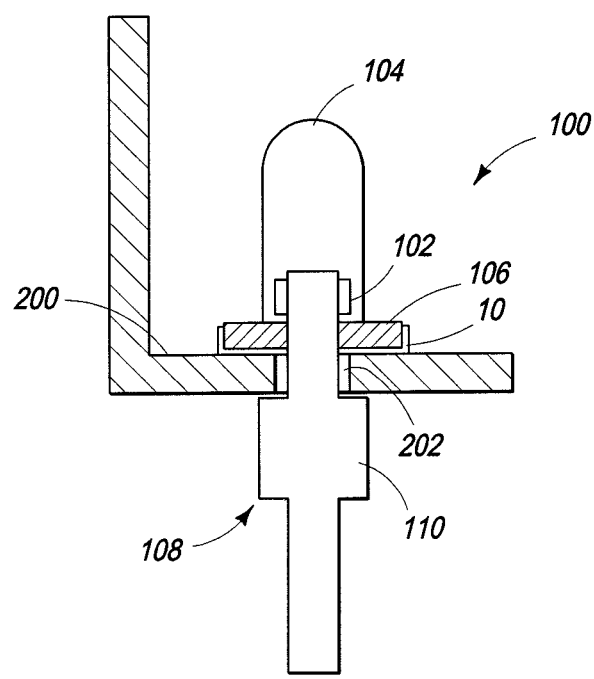
FIG. 2 is a sectional view of a nutplate being secured to a frame.
Figure 3:
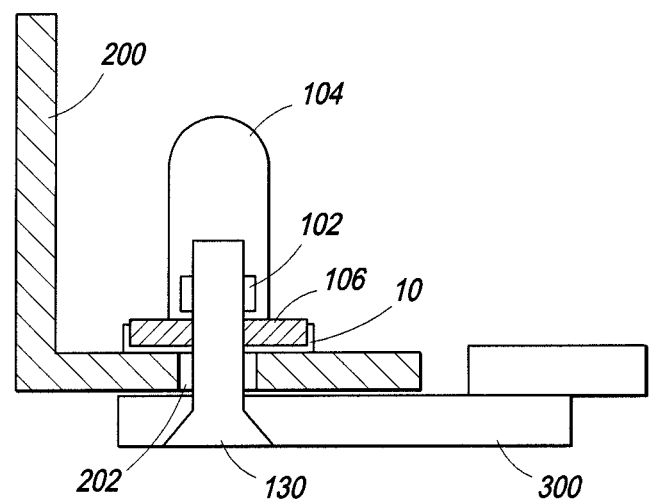
FIG. 3 is a sectional view of an element coupled to a frame.

In an embodiment, the nutplates 100 (FIG. 1) for securing this windshield are ClickBond CB6008CR5-3 produced by Click Bond Inc. of Carson City, Nev., a subsidiary of Physical Systems Inc., a Colorado corporation. These nutplates 100 have a floating nut 102 within a sealed cap 104 that prevents loss of air pressure even if a bolt coupled to the nut 102 is lost or otherwise not airtight. The nut 102 is retained close to a baseplate 106 by apparatus that is not shown. The baseplate 106 has a flat surface 112 adapted to be attached to planar components 200 (FIG. 2) with an adhesive 10. Reference numeral 10 may be used throughout this detailed description to refer to different adhesives adjacent the surface 112, as will be apparent. The nutplate 100 is provided with an elastomeric fixture 108 in the form of an elastomeric tail having a bulge 110 intended to be pulled through a hole 202 in the component 200 to retain the nutplate 100 in position, as illustrated in FIG. 2, while the adhesive 10 cures. Once the adhesive 10 is cured, the elastomeric fixture 108 is removed and a bolt 130 is passed through the hole 202, through a hole 114 in the baseplate 106, and coupled to the nut 102. In this manner, as shown in FIG. 3, the bolt 130 may hold an element 300 in place. Adhesion of the nutplate 100 for use with an aircraft windshield is only possible due to the advance set forth herein, and other nutplates (i.e., nutplates having different structure and manufacturer) may be used.

Figure 4:
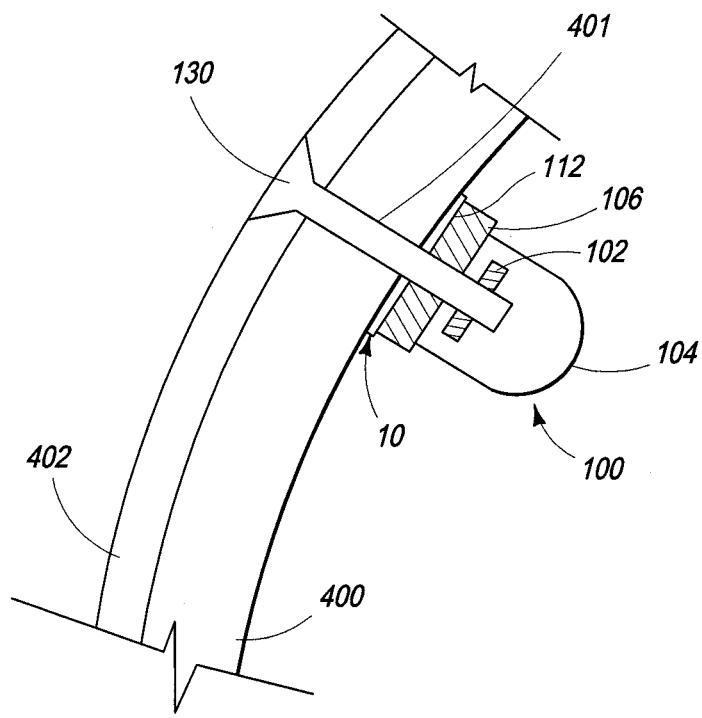
FIG. 4 is a sectional view of a retainer coupled to an airframe by a bolt and a nutplate that is adhered to the airframe.

As noted above, prior art aircraft almost exclusively rivet nutplates for windshields to airframe. Even though riveting requires rivet holes to be drilled in the airframe, which weakens the airframe, adhesive has not been generally considered to be a viable alternative due to the stresses and manufacturing/assembly requirements. The following issues are among the problems that have prohibited the use of adhesive for attaching nutplates for windshields to airframe 400 (FIG. 4): the airframe 400 is not flat (so an amount of curvature between the retainer 402 and the flat surface 112 must be filled by the adhesive 10); the adhesive 10 must not crack and must retain its strength despite cycling between temperatures as low as −67 F (−55 C) when at altitude and temperatures as high as 180 F (82 C) due to solar heating on the ground of a black glare shield beneath the windshield; the adhesive 10 must not crack and must retain its strength despite the airframe 400 flexing slightly during pressurization cycles; the nutplate 100 must remain in place despite approximately sixty inch pounds of torque required to fasten the bolt 130 to the nut 102; since the bolt 130 may become damaged and need to be drilled out, or the nutplate 100 may otherwise become damaged, the nutplate 100 must be removable for field replacement; cure time for the adhesive 10 must be reasonably fast for speed of production line assembly; working time for the adhesive 10 must be long enough to allow adequate time (e.g., fifteen minutes) for adhesive mixing, application of mixed adhesive, and assembly of nutplates 100 to the airframe 400; the nutplate 100 must remain in place when confronted with one hundred pounds of push out force across the temperature range of −67 F to 180 F; and the bond between the adhesive 10, the airframe 400, and the baseplate 106 must resist high temperature and humidity encountered by aircraft. In light of all of these stringent requirements and the catastrophic results that may occur if the attachment of a retainer 402 (which is coupled to the windshield) to the airframe 400 fails, the prior art's use of riveting and complete avoidance of adhesive is understandable even in light of the disadvantages associated with riveting.

Among the adhesives 10 that have proven to be inadequate in attaching the nutplate 100 to the airframe 400 are urethane adhesives, epoxies, acrylic adhesives, methacrylate adhesives, methyl methacrylate adhesives, and cyanoacrylate adhesives. Specific examples of adhesives 10 that have proven to be inadequate for attaching the nutplate 100 to the airframe 400 include, for example: Click Bond CB200-40; Henkel 9446; 3M DP810NS; ITW Plexus A0420; Devcon Metal Welder; Devcon Metal Welder II; Henkel Loctite 454; 3M EC3501; 3M Scotch Weld 2216; 3M EC2615; ITW Devcon HP250; ITW Devcon HP250FR; Devcon 10 Min.FR; 3M Automix 8115; 3M Automix FCE; Henkel EA9371; Huntsman 1559; Devcon FastCure; Henkel EA9359.3; Henkel EL2995; 3M Automix 08107; Devcon Epoxy Plus 25; Henkel 9309; Henkel EA9394.2; AC Tech AC236 B2; AC Tech AC350 B1/4; PRC DeSoto P/S 890 Class B; and Magnolia 123-464. Material Safety Data Sheets, which set forth the respective compositions for many of these adhesives, are in the Information Disclosure Statement accompanying this application, and therefore publicly available and easily accessible for posterity through the United States Patent & Trademark Office. The contents of the Material Safety Data Sheets for each of the adhesives discussed in this disclosure are expressly incorporated by reference herein, whether or not they appear in the accompanying Information Disclosure Statement. The Material Safety Data Sheets in the accompanying Information Disclosure Statement were obtained from publicly available sources, and the applicant has no ability to confirm their accuracy; however, these Material Safety Data Sheets are believed to correctly represent the corresponding adhesives. Each of these listed adhesives 10 has proved to be inadequate at least because of one or more of the problems set forth above. This has, in turn, taught away from using adhesives in nutplates for attaching windshields to airframes.

Nevertheless, even though there is no suggestion from the prior art that any adhesive 10 may in fact be entirely suitable for attaching nutplates 100 for windshields to airframe 400, or any suggestion from the prior art of which adhesive 10 from the almost infinite number of adhesives may be suitable in light of the known inadequate adhesives 10, we have discovered two adhesives 10 that are suitable, even though their specifications do not suggest better performance than the inadequate adhesives 10: 3M DP820 (a methyl methacrylate adhesive) and Ashland Pliogrip® 7779 (a urethane adhesive). 3M DP820 is the trade name for the product having the following composition:

| Ingredient | C.A.S. No. | % by Wt |
|---|---|---|
| Methyl Methacrylate | 80-62-6 | 40-70 |
| Chlorosulfonated Polyethylene | 68037-39-8 | 10-30 |
| Acrylic Polymer - N.J.T.S. Reg No. 800941-5008P | Trade Secret | 5-10 |
| Acrylic Polymer - N.J.T.S. Reg No. 800941-5007P | Trade Secret | 3-7 |
| Maleic Acid | 110-16-7 | 1-5 |
| Cumene Hydroperoxide | 80-15-9 | 0.5-1.5 |
| 2,6-di-tert-Butyl-p-Cresol | 128-37-0 | 0.5-1.5 |

Ashland Pliogrip® 7779 is the trade name for the product having the following composition:

| Ingredient | C.A.S. No. | % by Wt |
|---|---|---|
| METHYLENE PHENYLENE ISOCYANATE | 101-68-8 | 35.0 |
| URETHANE PREPOLYMER | Trade Secret | 19.0-23.0 |
| MDI HOMOPOLYMER | 25686-28-6 | 12.0-16.0 |
| CALCIUM SODIUM ALUMINOSILICATE | 1344-01-0 | 8.0-12.0 |
| TALC | 14807-96-6 | 8.0-12.0 |
| URETHANE PREPOLYMER | Trade Secret | 3.0-7.0 |
| AMORPHOUS SILICA | 68611-44-9 | 2.0-6.0 |

Especially because these suitable adhesives 10 are related to the inadequate adhesives 10, their suitability is surprising. It should be appreciated that adhesives are often referred to herein by trade name information, and that the composition of the adhesives (not the manufacturer or trade name) are of interest; adhesives may be manufactured by different companies and/or distributed under different names.

Returning to FIG. 4, in one embodiment, the baseplate 106 is adhered to the airframe 400 by 3M DP820 methyl methacrylate adhesive 10. More particularly, holes 401 are drilled in the airframe 400 in a predetermined pattern. The 3M DP820 methyl methacrylate adhesive 10 is mixed and applied to the bases 106 of the nutplates 100 (i.e., at surfaces 112). The nutplates 100 are placed in position over the respective holes 401, fixtures 108 (FIG. 1) are inserted through holes 401 and tensioned to draw bulges 110 (FIG. 1) through the hole 401, retaining the nutplates 100 in position. The 3M DP820 methyl methacrylate adhesive 10 is allowed to cure, and the fixtures 108 are then removed. The retainer 402 (which is coupled to the windshield) is positioned adjacent the airframe 400, and bolts 130 are installed through the retainer 402 and holes 401 into the nuts 102 of the nutplates 100. When installed in this way, the bolts 130 hold the retainer 402 and the windshield against the pressures of cockpit pressurization and high speed air drag.

In another embodiment, the baseplate 106 is adhered to the airframe 400 by Ashland Pliogrip® 7779 adhesive 10. In other words, the method and system described above regarding 3M DP820 are modified to replace 3M DP820 with Ashland Pliogrip® 7779. Other embodiments may utilize yet different adhesives, as the current disclosure that adhesive may be used to replace rivets for aircraft windshield nutplates with entirely satisfactory results, which is contrary to conventional wisdom, may prompt research into the issue and cause additional acceptable adhesives to be identified.

Those skilled in the art appreciate that variations from the specified embodiments disclosed above are contemplated herein and that the described embodiments are not limiting. The description should not be restricted to the above embodiments, but should be measured by the following claims.

What is claimed is:

1. A portion of an aircraft, comprising:
    an airframe;
    a nutplate coupled to the airframe by adhesive;
    a retainer coupled to a window; and
    a bolt passing through a hole of the retainer, through a hole in the airframe, and into the nutplate to secure the retainer to the airframe;
    wherein the adhesive comprises at least one of composition 1 in Table 1 and composition 2 in Table 2:

TABLE 1 composition 1

| Ingredient | approximate % by Wt |
|---|---|
| Methyl Methacrylate | 40-70 |
| Chlorosulfonated Polyethylene | 10-30 |
| Acrylic Polymer | 5-10 |
| Acrylic Polymer | 3-7 |
| Maleic Acid | 1-5 |
| Cumene Hydroperoxide | 0.5-1.5 |
| 2,6-di-tert-Butyl-p-Cresol | 0.5-1.5 |

And

TABLE 2 composition 2

| Ingredient | approximate % by Wt |
|---|---|
| METHYLENE PHENYLENE ISOCYANATE | 35 |
| URETHANE PREPOLYMER | 19-23 |
| MDI HOMOPOLYMER | 12-16 |
| CALCIUM SODIUM ALUMINOSILICATE | 8-12 |
| TALC | 8-12 |
| URETHANE PREPOLYMER | 3-7 |
| AMORPHOUS SILICA | 2-6. |

2. A method of maintaining structural integrity of an airframe while attaching a window to the airframe during manufacture of an aircraft, the method comprising the steps:

applying to a bonding surface of a nutplate an adhesive;

maintaining the adhesive-coated bonding surface of the nutplate adjacent an interior surface of the airframe; and allowing the adhesive to cure;

wherein the adhesive is selected such that the nutplate is secured by the adhesive such that:

the bond between the nutplate and the airframe will withstand a bolt-fastening torque of at least 60 inch pounds;

the bond between the nutplate and the airframe will withstand cycling over a temperature range from approximately −55 degrees Celsius to approximately 82 degrees Celsius;

wherein the adhesive comprises at least one of composition 1 in Table 1 and composition 2 in Table 2:

TABLE 1 composition 1

| Ingredient | approximate % by Wt |
|---|---|
| Methyl Methacrylate | 40-70 |
| Chlorosulfonated Polyethylene | 10-30 |
| Acrylic Polymer | 5-10 |
| Acrylic Polymer | 3-7 |
| Maleic Acid | 1-5 |
| Cumene Hydroperoxide | 0.5-1.5 |
| 2,6-di-tert-Butyl-p-Cresol | 0.5-1.5 | and

TABLE 2 composition 2

| Ingredient | approximate % by Wt |
|---|---|
| METHYLENE PHENYLENE ISOCYANATE | 35 |
| URETHANE PREPOLYMER | 19-23 |
| MDI HOMOPOLYMER | 12-16 |
| CALCIUM SODIUM ALUMINOSILICATE | 8-12 |
| TALC | 8-12 |
| URETHANE PREPOLYMER | 3-7 |
| AMORPHOUS SILICA | 2-6. |

3. The method of claim 2, wherein the adhesive is allowed to cure for at least 15 minutes.

4. The method of claim 3, wherein the nutplate bonding surface is generally planar.

5. A method for attaching a window to an airframe via a rivetless nutplate, comprising:

applying to a bonding surface of the nutplate an adhesive;

inserting through a hole in the airframe an elastomeric fixture attached to a nut of the nutplate, and pulling the elastomeric fixture to apply tension to the elastomeric fixture to hold the adhesive-coated bonding surface of the nutplate adjacent an interior surface of the airframe;

allowing the adhesive to cure;

removing the elastomeric fixture from the nut of the nutplate; and installing a bolt through a hole of a retainer, through the hole in the airframe, and into the nutplate; the retainer being in contact with and securing the window to the airframe;

wherein the adhesive comprises at least one of composition 1 in Table 1 and composition 2 in Table 2:

TABLE 1 composition 1

| Ingredient | approximate % by Wt |
|---|---|
| Methyl Methacrylate | 40-70 |
| Chlorosulfonated Polyethylene | 10-30 |
| Acrylic Polymer - N.J.T.S. Reg No. 800941-5008P | 5-10 |
| Acrylic Polymer - N.J.T.S. Reg No. 800941-5007P | 3-7 |
| Maleic Acid | 1-5 |
| Cumene Hydroperoxide | 0.5-1.5 |
| 2,6-di-tert-Butyl-p-Cresol | 0.5-1.5 |

And

TABLE 2 composition 2

| Ingredient | approximate % by Wt |
|---|---|
| METHYLENE PHENYLENE ISOCYANATE | 35 |
| URETHANE PREPOLYMER | 19-23 |
| MDI HOMOPOLYMER | 12-16 |
| CALCIUM SODIUM ALUMINOSILICATE | 8-12 |
| TALC | 8-12 |
| URETHANE PREPOLYMER | 3-7 |
| AMORPHOUS SILICA | 2-6. |

6. A method of maintaining structural integrity of an airframe while attaching a window to the airframe during manufacture of an aircraft, the method comprising the steps of not riveting a nutplate to the airframe, but instead:

applying to a bonding surface of the nutplate an adhesive selected from the group consisting of urethane adhesives and methyl methacrylate adhesives;
maintaining the adhesive-coated bonding surface of the nutplate adjacent an interior surface of the airframe;
allowing the adhesive to cure; and
installing a bolt through a hole of a retainer, through the hole in the airframe, and into the nutplate; the retainer being in contact with and securing the window to the airframe;
wherein the adhesive has a working time of at least 15 minutes; and
wherein the adhesive is selected such that the nutplate is secured by the adhesive such that:
  the bond between the nutplate and the airframe will withstand a bolt-fastening torque of at least 60 inch pounds;
  the bond between the nutplate and the airframe will withstand cycling over a range of temperatures expected to be encountered by an aircraft in flight;
  the bond between the nutplate and the airframe will withstand a push out force of at least one hundred pounds over the range of temperatures; and
  the bond between the nutplate and the airframe will withstand flexing of the airframe during pressurization cycles expected to be encountered by the aircraft;
wherein the adhesive comprises the composition in Table 1:

TABLE 1

| Ingredient | approximate % by Wt |
|---|---|
| Methyl Methacrylate | 40-70 |
| Chlorosulfonated Polyethylene | 10-30 |
| Acrylic Polymer - N.J.T.S. Reg No. 800941-5008P | 5-10 |
| Acrylic Polymer - N.J.T.S. Reg No. 800941-5007P | 3-7 |
| Maleic Acid | 1-5 |
| Cumene Hydroperoxide | 0.5-1.5 |
| 2,6-di-tert-Butyl-p-Cresol | 0.5-1.5. |

7. The method of claim 6, wherein the range of temperatures is from approximately −55 degrees Celsius to approximately 82 degrees Celsius.

8. A method for attaching a window to an airframe, comprising:
applying to a bonding surface of a nutplate an adhesive;
inserting through a hole in the airframe an elastomeric fixture attached to a nut of the nutplate, and pulling the elastomeric fixture to apply tension to the elastomeric fixture to hold the adhesive-coated bonding surface of the nutplate adjacent an interior surface of the airframe;
allowing the adhesive to cure;
removing the elastomeric fixture from the nut of the nutplate; and
installing a bolt through a hole of a retainer, through the hole in the airframe, and into the nutplate; the retainer being in contact with and securing the window to the airframe;
wherein the adhesive is selected such that the nutplate is secured by the adhesive such that:
  the bond between the nutplate and the airframe will withstand a bolt-fastening torque of at least 60 inch pounds;
  the bond between the nutplate and the airframe will withstand cycling over a range of temperatures expected to be encountered by an aircraft in flight;
  the bond between the nutplate and the airframe will withstand a push out force of at least one hundred pounds over the range of temperatures expected to be encountered by the aircraft; and
  the bond between the nutplate and the airframe will withstand flexing of the airframe during pressurization cycles expected to be encountered by the aircraft in flight; and
wherein the adhesive has a working time of at least 15 minutes;
wherein the adhesive comprises at least one of composition 1 in Table 1 and composition 2 in Table 2:

TABLE 1 composition 1

| Ingredient | approximate % by Wt |
|---|---|
| Methyl Methacrylate | 40-70 |
| Chlorosulfonated Polyethylene | 10-30 |
| Acrylic Polymer - N.J.T.S. Reg No. 800941-5008P | 5-10 |
| Acrylic Polymer - N.J.T.S. Reg No. 800941-5007P | 3-7 |
| Maleic Acid | 1-5 |
| Cumene Hydroperoxide | 0.5-1.5 |
| 2,6-di-tert-Butyl-p-Cresol | 0.5-1.5 | and

TABLE 2 composition 2

| Ingredient | approximate % by Wt |
|---|---|
| METHYLENE PHENYLENE ISOCYANATE | 35 |
| URETHANE PREPOLYMER | 19-23 |
| MDI HOMOPOLYMER | 12-16 |
| CALCIUM SODIUM ALUMINOSILICATE | 8-12 |
| TALC | 8-12 |
| URETHANE PREPOLYMER | 3-7 |
| AMORPHOUS SILICA | 2-6. |

9. The method of claim 8, wherein the nutplate bonding surface is generally planar.

10. The method of claim 8, wherein the range of temperatures is from approximately −55 degrees Celsius to approximately 82 degrees Celsius.

* * * * *